US010555639B2

(12) United States Patent
Casternovia

(10) Patent No.: US 10,555,639 B2
(45) Date of Patent: Feb. 11, 2020

(54) CHAFING DISH AND FRAME ASSEMBLY

(71) Applicant: Sam Casternovia, Warren, NJ (US)

(72) Inventor: Sam Casternovia, Warren, NJ (US)

(*) Notice: Subject to any disclaimer, the term of this patent is extended or adjusted under 35 U.S.C. 154(b) by 371 days.

(21) Appl. No.: 15/386,389

(22) Filed: Dec. 21, 2016

(65) Prior Publication Data

US 2018/0168394 A1 Jun. 21, 2018

(51) Int. Cl.
*A47J 39/02* (2006.01)
*A47J 36/34* (2006.01)
*A47J 36/24* (2006.01)
*A47J 36/06* (2006.01)
*A47J 39/00* (2006.01)
*B65D 43/02* (2006.01)

(52) U.S. Cl.
CPC ............... *A47J 36/34* (2013.01); *A47J 36/06* (2013.01); *A47J 36/2477* (2013.01); *A47J 39/006* (2013.01); *A47J 39/02* (2013.01); *B65D 43/0202* (2013.01)

(58) Field of Classification Search
CPC ..... A47J 39/006; A47J 39/02; B65D 43/0202; B65D 2543/0037
USPC .......... 99/483, 449, 339, 410; 220/810, 831, 220/837
See application file for complete search history.

(56) References Cited

U.S. PATENT DOCUMENTS

| 4,989,748 A | * | 2/1991 | Parr, Jr. | A47G 19/26 219/734 |
| 5,010,846 A | * | 4/1991 | Nass | A01K 1/0356 119/475 |
| 5,335,805 A | * | 8/1994 | Chen | B65F 1/02 220/668 |
| 6,705,210 B2 | * | 3/2004 | Leonard | A47J 36/24 126/384.1 |
| 2002/0073984 A1 | * | 6/2002 | Ahn | A47J 36/24 126/33 |
| 2003/0136272 A1 | * | 7/2003 | Brown | A47J 27/10 99/483 |
| 2013/0019631 A1 | * | 1/2013 | Luft | A47J 47/01 62/440 |

FOREIGN PATENT DOCUMENTS

DE 102012209300 A1 * 12/2013 ............. A47J 39/02

* cited by examiner

*Primary Examiner* — Reginald Alexander
(74) *Attorney, Agent, or Firm* — Ezra Sutton

(57) ABSTRACT

A chafing dish and frame assembly including a lower frame section for supporting a disposable food tray for holding food, an upper frame section pivotally attached to the lower frame section; a disposable food cover supported by the upper frame section; and a pivot hinge that pivotally connects the upper frame section to the lower frame section. The pivot hinge allows the disposable food cover to be pivoted up to ninety degrees relative to the disposable food tray from a closed position, wherein the disposable food cover rests on top of the disposable food tray, to an open position wherein the disposable food cover is pivoted upwardly so that the food in the disposable food tray may be accessed.

11 Claims, 9 Drawing Sheets

CHAFING DISH AND FRAME ASSEMBLY

FIELD OF THE INVENTION

This invention relates to a frame assembly for supporting disposable chafing dishes having a lower frame for supporting a disposable food tray and an attached upper frame for supporting a disposable food cover. The frame assembly permits the disposable food cover to pivot relative to the disposable food tray.

BACKGROUND OF THE INVENTION

It is well known in the art to provide chafing dishes including a support frame for supporting a food tray, a detachable cover or lid, and a heat source. Also, when the food is to be served hot, it is common to place a petroleum-based gel within a can which is commonly referred to as "sterno," or analogous burners, underneath the tray. The tray may be filled with water, and dishes or smaller trays containing the food are placed in the heated water. Alternately, the tray may be directly filled with the food. Typically, however, the support frame only supports the disposable food tray, while the cover or lid is not supported by a frame.

Therefore, there is a need for a chafing dish that has an upper frame for supporting a food cover which is pivotally connected to the lower frame, and is nestable with and pivots relative to the lower frame in alternate embodiments, in order to overcome the present shortcomings with current chafing dishes and support frames.

DESCRIPTION OF THE PRIOR ART

None of the following prior patents teach or disclose the basic structure of a chafing dish and frame assembly including a lower frame section for supporting a disposable food tray for holding food, and an upper frame section pivotally attached to the lower frame section. A disposable food cover is supported by the upper frame section, and a pivot hinge pivotally connects the upper frame section to the lower frame section.

Further, none of the following prior patents teach or disclose the basic structure of a chafing dish and frame assembly including a lower frame section for supporting a disposable food tray for holding food, and an upper frame section for supporting a disposable food cover, wherein the upper frame section is nestably attached to the lower frame section such that the upper frame section pivots relative to the lower frame section.

Finally, none of the following prior patents teach or disclose the basic structure of a chafing dish and frame assembly which includes a lower frame section for supporting a disposable food tray for holding food, and an upper pivot bar frame assembly that pivotally connects a disposable food cover directly to the disposable food tray while it is supported by the lower frame section.

Foldable and collapsible chafing dish frames that only hold and support food trays are known in the art. For example, U.S. Pat. No. 5,467,697 to Hunziker, U.S. Pat. No. 6,234,068 to Sherman, and U.S. Pat. App. Pub. No. 2005/0167381 to Fariello provide chafing dish frames with collapsible pivoting legs for supporting food trays. Further, U.S. Pat. No. 8,899,438 to Leonard et al. provides a chafing dish frame with integral handles for supporting a food tray.

In addition, chafing dishes with pivotable covers are known in the art. For example, U.S. Pat. No. 9,220,375 to Haber provides a chafing dish with a cover hingedly attached to a food tray so that the cover can be raised and lowered relative to the tray.

Furthermore, detachable stands that are designed to hold the covers of chafing dishes in an upright, open position are also known in the art. For example, U.S. Pat. No. 4,773,555 to Merino provides a detachable stand that holds the cover of a chafing dish in an upright orientation after it has been removed from the top of the tray of the chafing dish.

OBJECTS OF THE INVENTION

It is an object of the present invention to provide a chafing dish and frame assembly having a lower frame section for supporting a disposable food tray for holding food; an upper frame section pivotally attached to the lower frame section; a disposable food cover supported by the upper frame section; and a pivot hinge that pivotally connects the upper frame section to the lower frame section. The upper frame section further provides a structural support and gripping means, which may include one or more handles, for safely pivoting the hot cover or lid to an open or closed position without burning the user's fingers or hands.

It is another object of the present invention to provide a chafing dish and frame assembly having both a lower frame section for supporting a disposable food tray for holding food and an upper frame section for supporting a disposable food cover. The upper frame section can be detachably and nestably secured to the lower frame section.

It is yet a further object of the present invention to provide a chafing dish and frame assembly having a lower frame section for supporting a disposable food tray for holding food, wherein an upper pivot bar frame assembly detachably and pivotally attaches a disposable food cover to the disposable food tray.

Further objects and advantages of the present invention will become more readily apparent to those ordinarily skilled in the art after reviewing the following detailed description and accompanying drawings.

SUMMARY OF THE INVENTION

The present invention provides a chafing dish and frame assembly having a lower frame section for supporting a disposable food tray for holding food; an upper frame section pivotally attached to the lower frame section; a disposable food cover supported by the upper frame section; and a pivot hinge that pivotally connects the upper frame section to the lower frame section. The pivot hinge allows the disposable food cover to be pivoted ninety degrees relative to the disposable food tray from a closed position, wherein the disposable food cover rests on top of the disposable food tray, to an open position wherein the disposable food cover is pivoted upwardly so that the food in the disposable food tray may be accessed. The upper frame section further provides a structural support and gripping means, which may include one or more handles, for safely pivoting the hot cover or lid to an open or closed position without burning the user's fingers or hands.

In an alternate embodiment, a chafing dish and frame assembly is provided having a lower frame section for supporting a disposable food tray for holding food, and a detachable and netsable upper frame section for supporting a disposable food cover. The upper frame further provides a structural support and gripping means, which may include handles, for safely lifting and carrying the hot cover or lid of a chafing dish without burning the user's fingers or hands.

In an additional embodiment, a chafing dish and frame assembly is provided having a lower frame section for supporting a disposable food tray for holding food. In addition, an upper pivot bar frame assembly is provided for pivotally and hingedly attaching a disposable food tray cover to the disposable food tray.

DETAILED DESCRIPTION OF THE EMBODIMENTS

Figure 1:
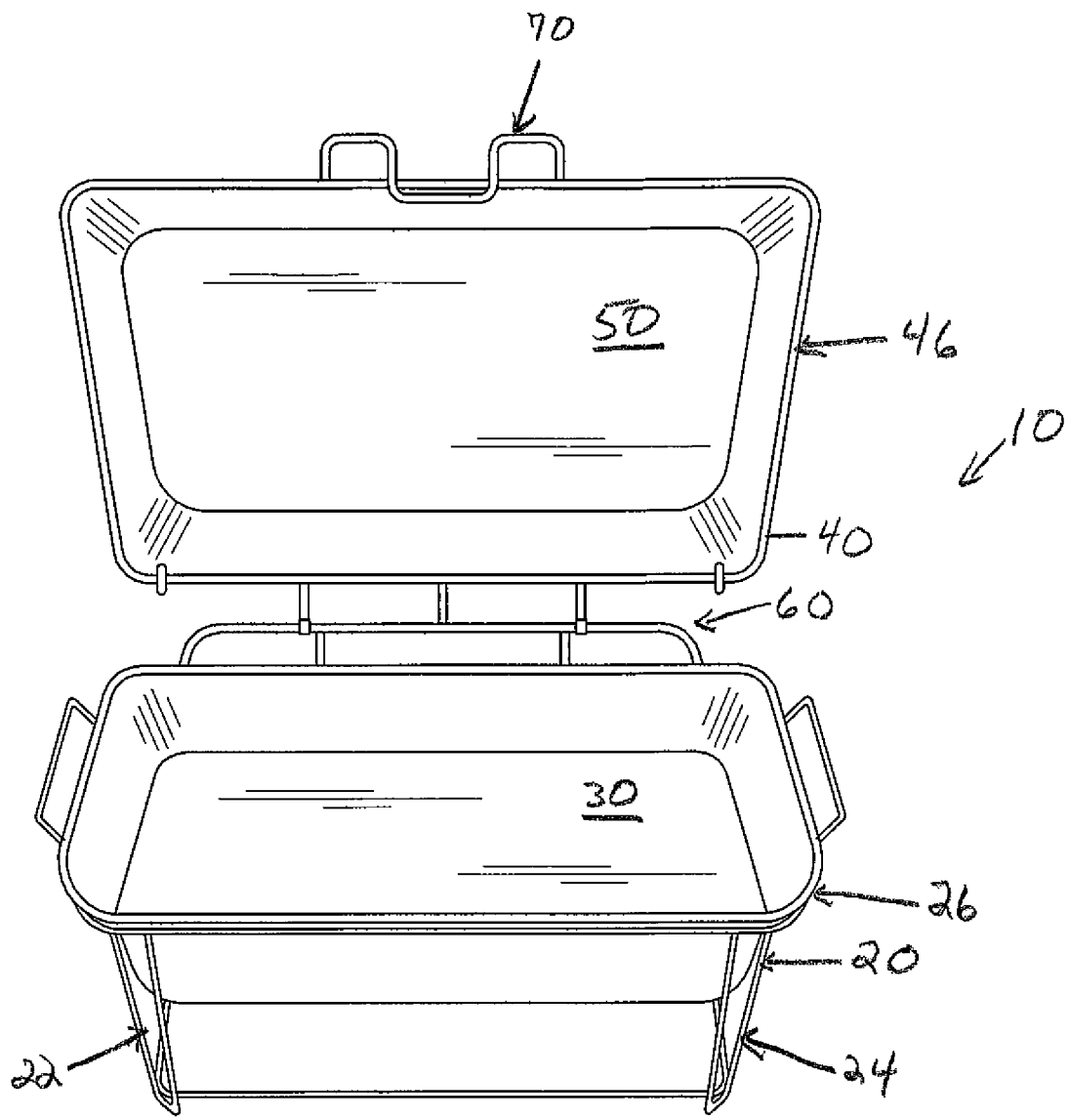
FIG. 1 is a front perspective view of an assembled chafing dish and frame assembly in accordance with a first embodiment of the present invention with the frame assembly in the open position, and wherein the disposable food tray is supported by the lower frame section, and the disposable food cover is supported by the upper frame section.
Figure 2:
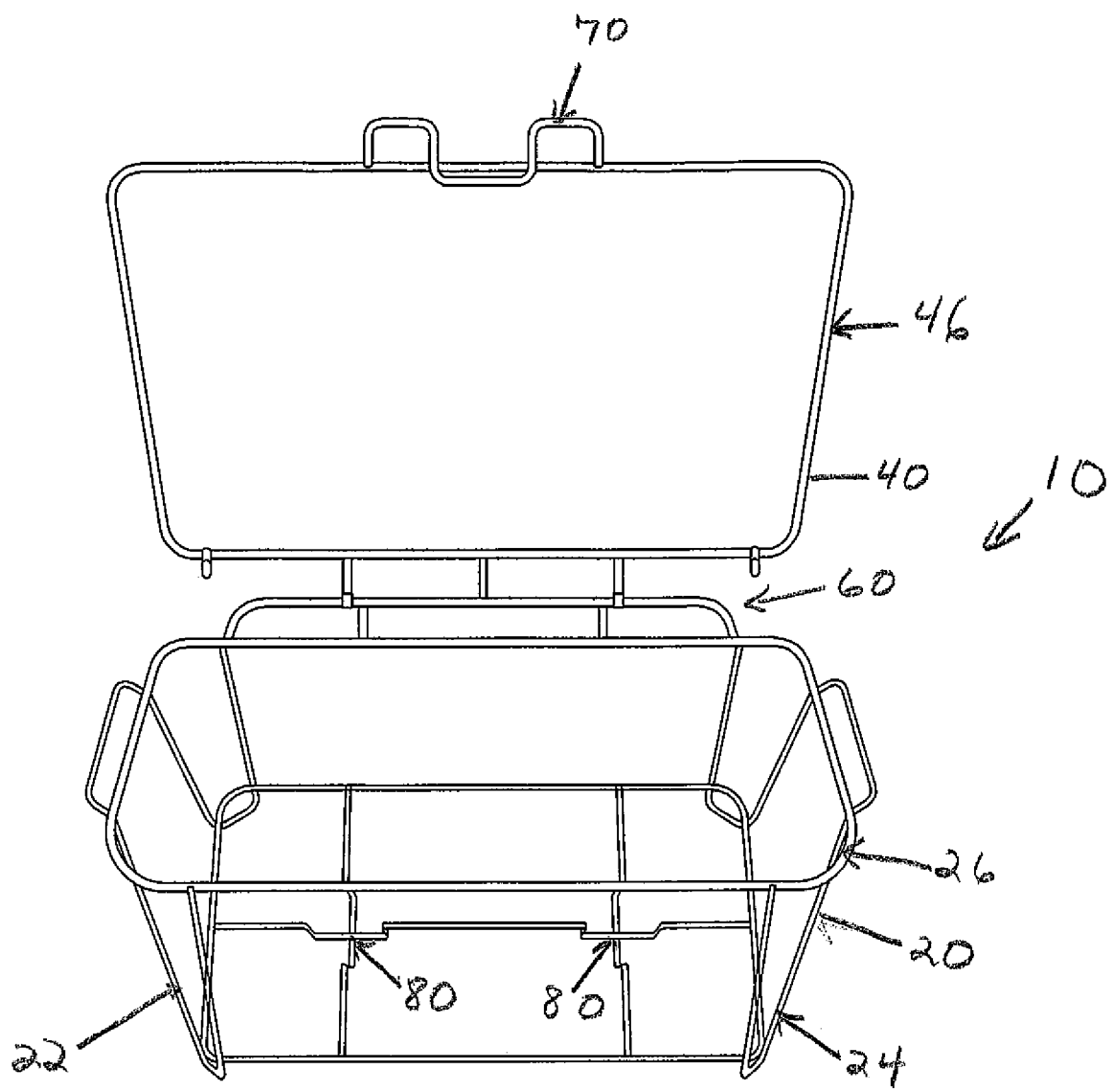
FIG. 2 is a is a front perspective view of an assembled chafing dish and frame assembly in accordance with a first embodiment of the present invention, wherein the frame assembly in the open position.

The present invention provides a chafing dish and frame assembly 10, as shown in FIGS. 1 and 2, comprising a lower frame section 20 for supporting a disposable food tray 30 for holding food, and an upper frame section 40 pivotally attached to the lower frame section 20. A disposable food cover 50 is also provided which is supported by the upper frame section 40. A pivot hinge assembly 60 is also provided to pivotally connect the upper frame section 40 to the lower frame section 20. The pivot hinge 60 allows the disposable food cover 50 to be pivoted ninety degrees relative to the disposable food tray 30 from a closed position, wherein the disposable food cover 50 rests on top of the disposable food tray 30, to an open position wherein the disposable food cover 50 is pivoted upwardly to an open position so that the food in the disposable food tray 30 may be accessed.

The upper frame section 40 may further provide a structural support and gripping means, which may include one or more handles 70 for pivoting the disposable food cover 50 to an open or closed position.

The lower frame section 20 includes multiple support legs 22 and 24, and an upper rim 26 that extends around the four sides of the lower frame section 20, so that the rim 26 supports the food tray 30 on all four sides.

The upper frame section 40 also includes an upper rim member 46 that extends around the four sides of the upper frame section 40, so that the rim 46 supports the food cover 50 on all four sides.

Figure 3:
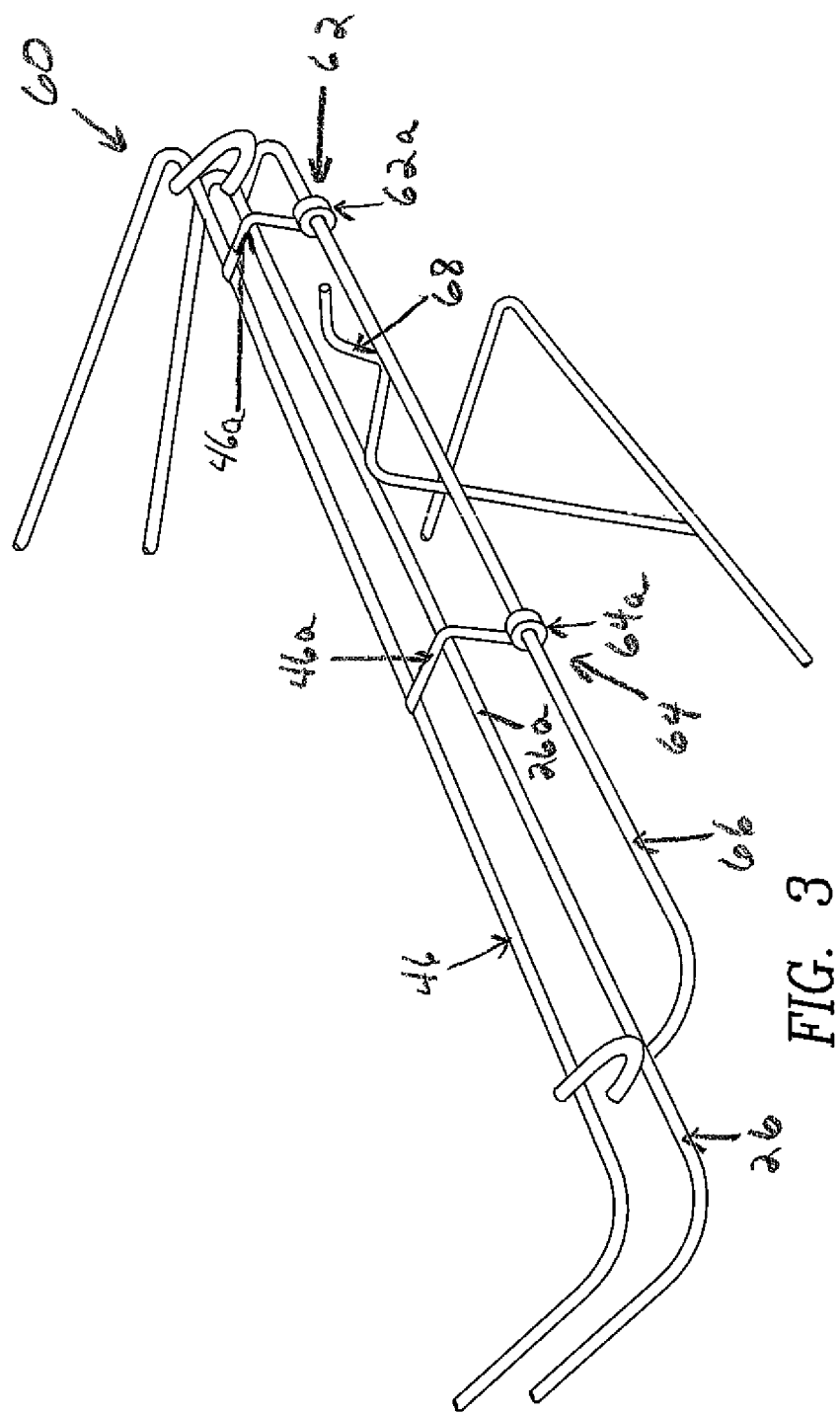
FIG. 3 is a front perspective view of the pivot hinge of an assembled chafing dish and frame assembly in accordance with a first embodiment of the present invention.

As shown in FIG. 3, the pivot hinge 60 includes two or more pivoting hinge members 62 and 64 which are fixedly connected to the rear leg 46a of upper rim member 46. A hinge support rod 66 is connected to the rear side 26a of the upper rim member 26 of the lower frame section 20. Also, circular hinge members 62a and 64a are pivotally connected to hinge support rod 66. Hinge support rod 66 can also include a stop member 68 to support upper frame section 40 in an open position that is perpendicular to the upper rim member 46 of the upper frame section 40.

The lower frame section 20 may further provide a structural support 80 for holding heat sources 90 for heating or warming the food contents in the disposable food tray 30. The heat sources 90 typically include petroleum-based gel within a can which produce a flame and are commonly referred to as "sterno"; however, other analogous burners may be used.

In addition, the upper and lower frame sections 20 and 40 are formed of rigid aluminum, steel, iron, aluminum alloy, steel alloy, or iron alloy. The disposable food tray 30 and the disposable food cover 50 are formed of lightweight and disposable aluminum material which are inexpensive. Such aluminum food trays and aluminum food covers are readily available in the marketplace, and are commonly used for cooking food in ovens, on a stove, or over various heat sources. Other metal food trays or covers may be used such as light weight and thin aluminum, steel, iron, copper, aluminum alloy, steel alloy, iron alloy, or copper alloy.

Figure 4:
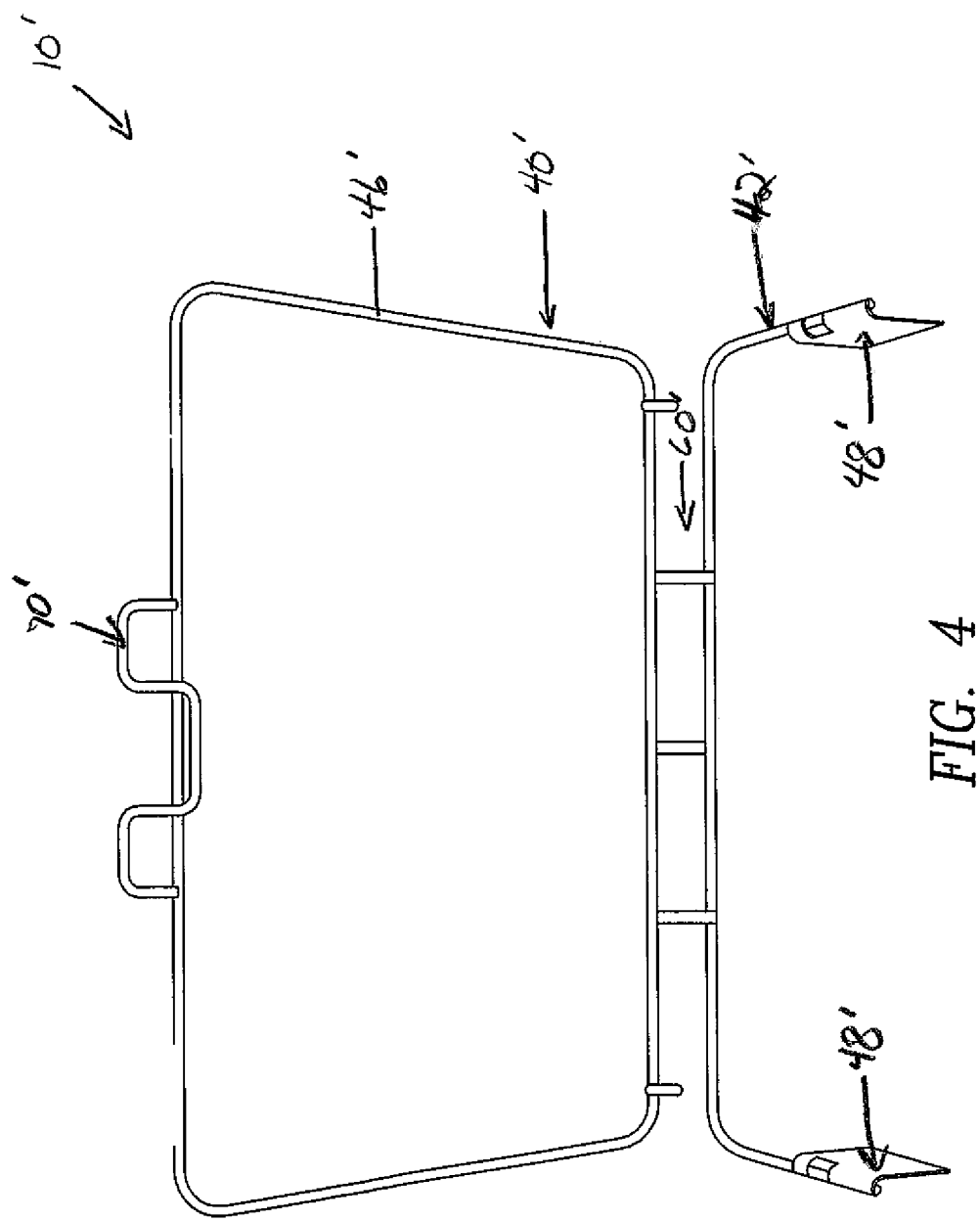
FIG. 4 is a front perspective view of the upper frame section of an assembled chafing dish and frame assembly in accordance with a second embodiment of the present invention.
Figure 5:
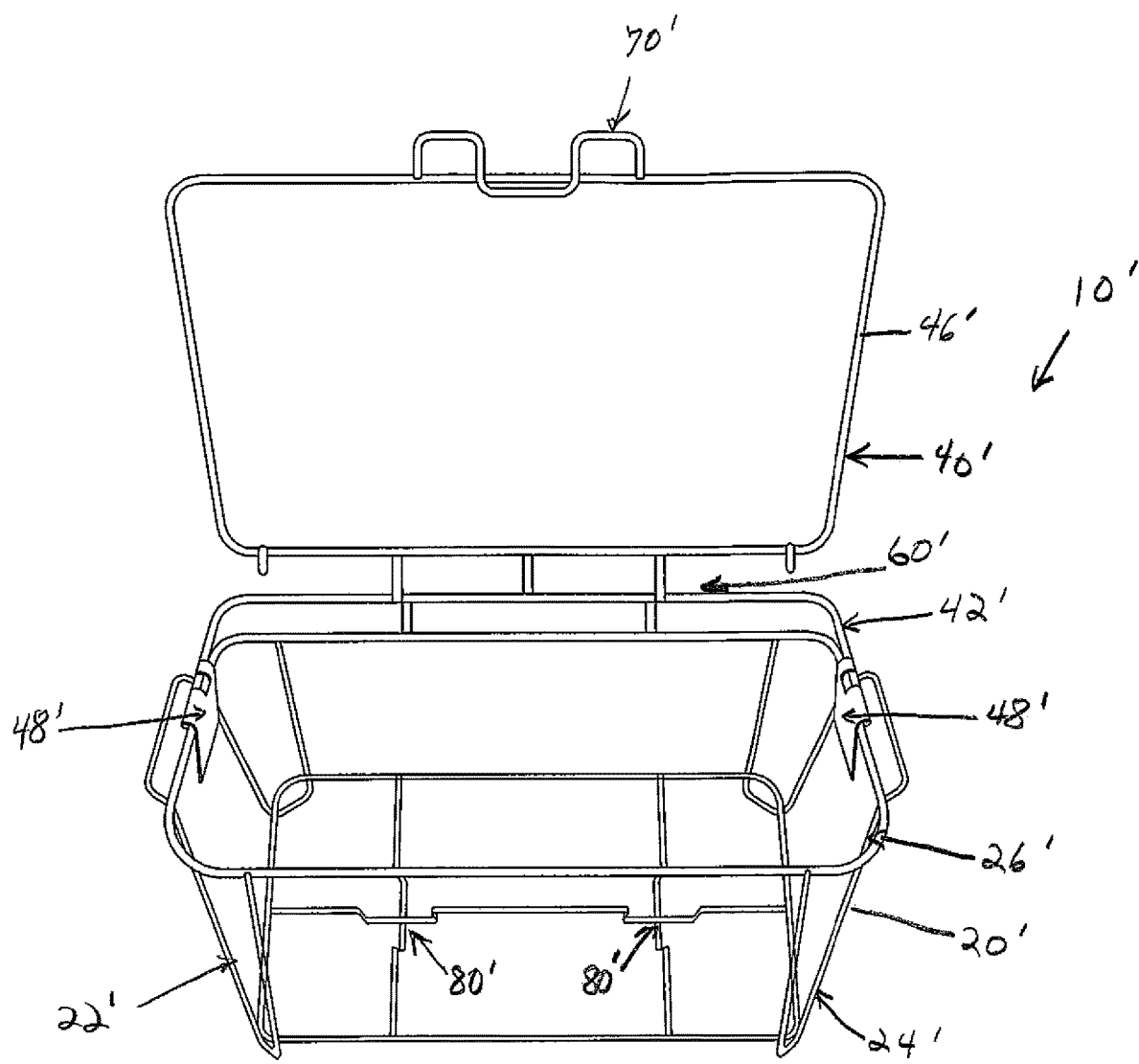
FIG. 5 is a is a front perspective view of an assembled chafing dish and frame assembly in accordance with a second embodiment of the present invention, wherein the upper frame section is nestably attached to the lower frame section in the open position.
Figure 6:
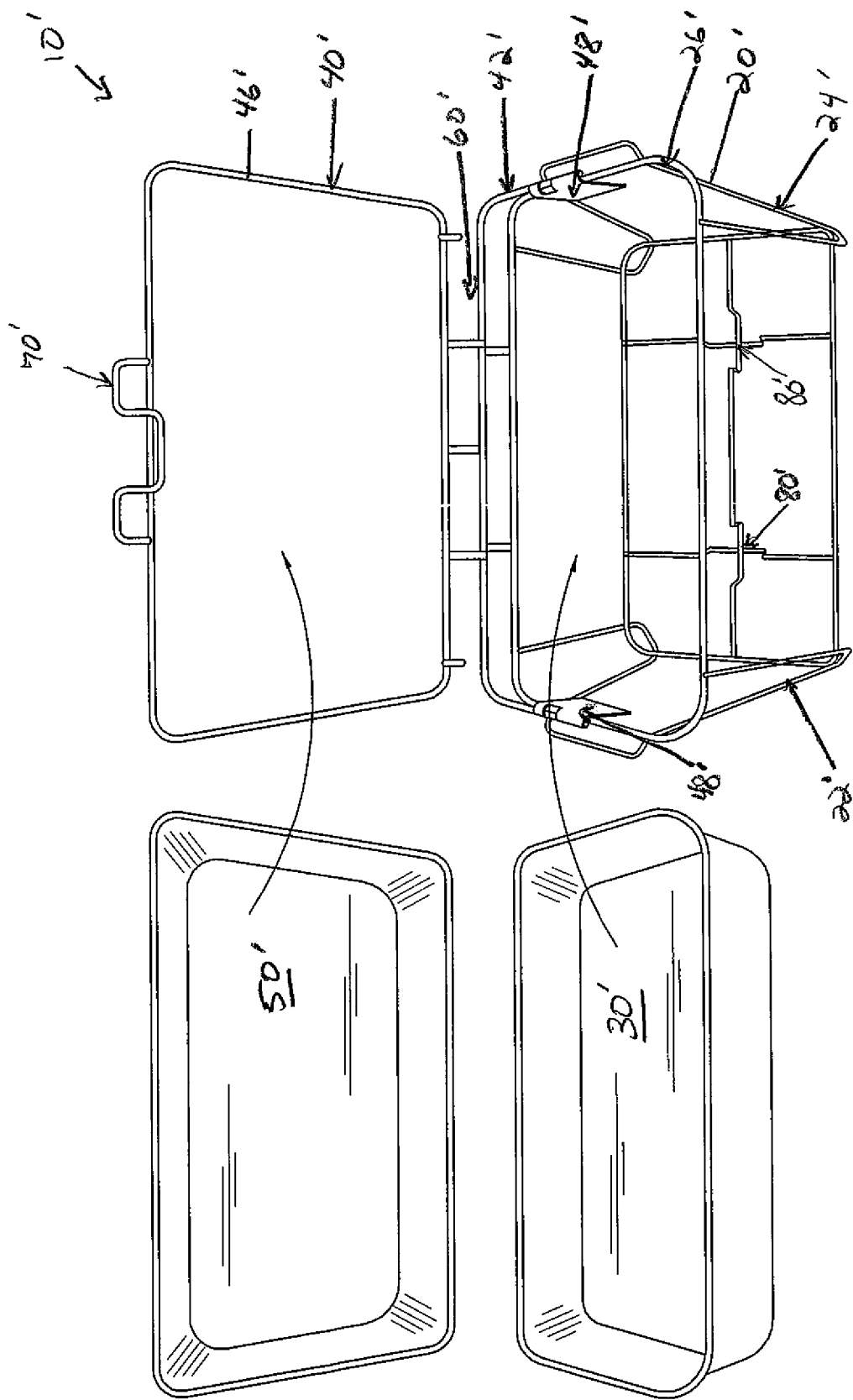
FIG. 6 is a exploded perspective view of an assembled chafing dish and frame assembly in accordance with a second embodiment of the present invention, wherein the upper frame section is nestably attached to the lower frame section in the open position, and wherein the disposable food tray can be supported by the lower frame section, and the disposable food cover can be supported by the upper frame section.

In a second embodiment, as shown in FIGS. 4, 5, and 6, a chafing dish and frame assembly 10' comprises a lower frame section 20' for supporting a disposable food tray 30' for holding food, and a detachable and nestable upper frame section 40' for supporting a disposable food cover 50'.

The lower frame section 20' includes multiple support legs 22' and 24', and an upper rim 26' that extends around the four sides of the lower frame section 20', so that the rim 26' supports the food tray 30' on all four sides.

The upper frame section 40' includes an upper rim member 46' that extends around the four sides of the upper frame section 40', so that the rim 46' supports the food cover 50' on all four sides. A pivot hinge assembly 60' pivotally connects the upper rim member 46' to a middle attachment frame 42'.

Similar to as shown in FIG. 3, the pivot hinge 60' includes two or more pivoting hinge members 62' and 64' which are fixedly connected to the rear leg 46a' of upper rim member 46.' A hinge support rod 66' is connected to the rear side 42a' of the middle attachment frame 42', and circular hinge members 62a' and 64a' are pivotally connected to hinge support rod 66'. Hinge support rod 66' can also include a stop member 68' to support upper frame section 40' in an open position, which is perpendicular to the upper rim member 46' of the upper frame section 40'.

The middle attachment frame 42' detachably connects the upper frame section 40' to the lower frame section 20' so that the upper frame section 40' is nestable within the lower frame section 20'. In addition the middle attachment frame 42' is nestably secured to the lower frame section 20' preferably by clip plates 48'.

Also, the upper frame section 40' may further provide a structural support and gripping means, which may include handles 70' for lifting and carrying the disposable food cover 50'.

Furthermore, the lower frame section 20' may further provide a structural support 80' for holding heat sources 90' for heating or warming the food contents in the disposable food tray 30'. The heat sources 90' typically include petroleum-based gel within a can which produce a flame and are commonly referred to as "sterno"; however, other analogous burners may be used.

In addition, the upper, middle and lower frame sections 20', 40', 42' are formed of rigid aluminum, steel, iron, aluminum alloy, steel alloy, or iron alloy. The disposable food tray 30' and the disposable food cover 50' are formed of lightweight and disposable aluminum material which are inexpensive. Such aluminum food trays and aluminum food covers are readily available in the marketplace, and are commonly used for cooking food in ovens, on a stove, or over various heat sources. Other metal food trays or covers may be used such as light weight and thin steel, iron, copper, aluminum alloy, steel alloy, iron alloy, or copper alloy.

Figure 7:
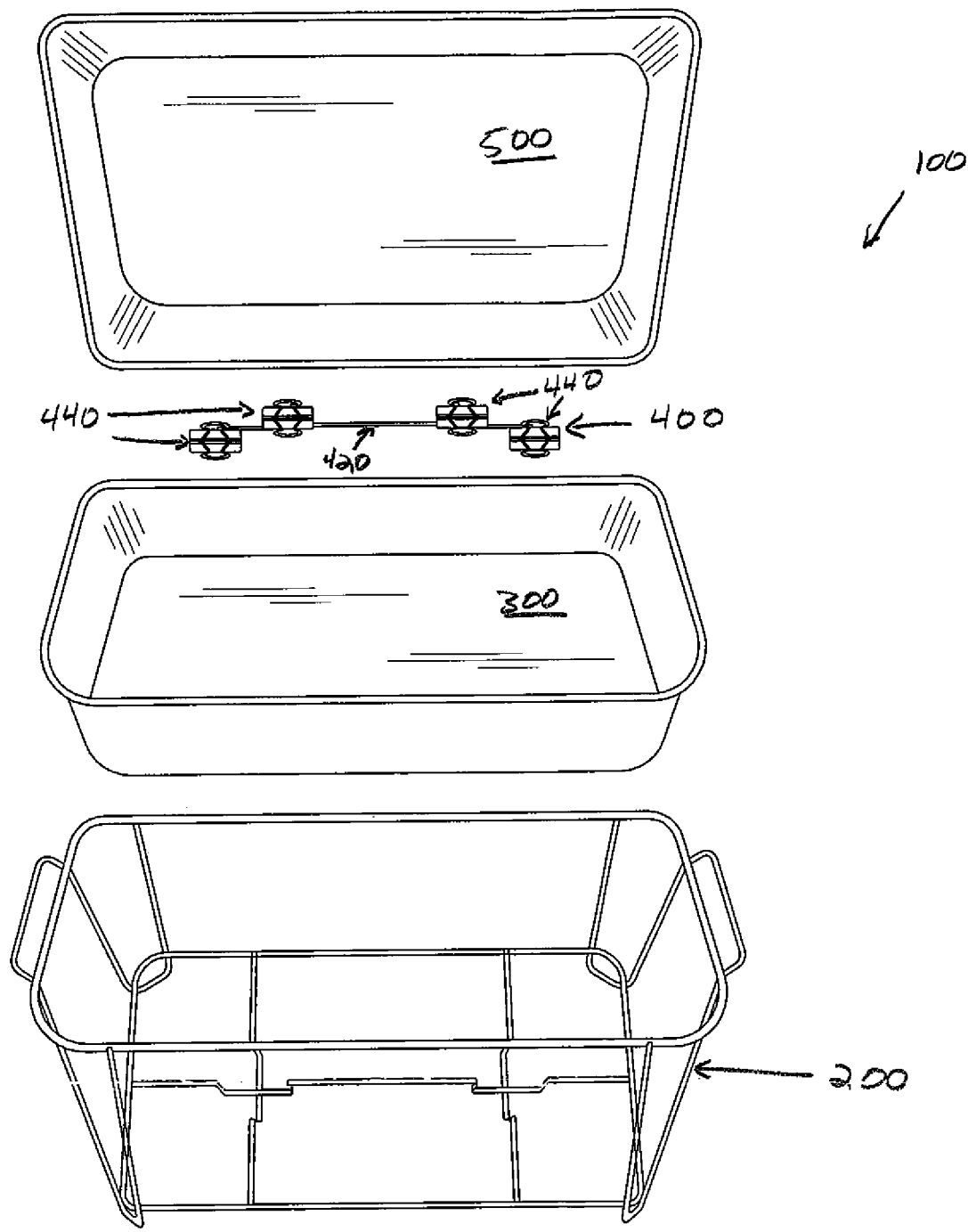
FIG. 7 is a exploded perspective view of an assembled chafing dish and frame assembly in accordance with a third embodiment of the present invention, wherein an upper pivot bar frame assembly pivotally and hingedly attaches the disposable food tray cover to the disposable food tray when it is supported by the lower frame section.
Figure 8:
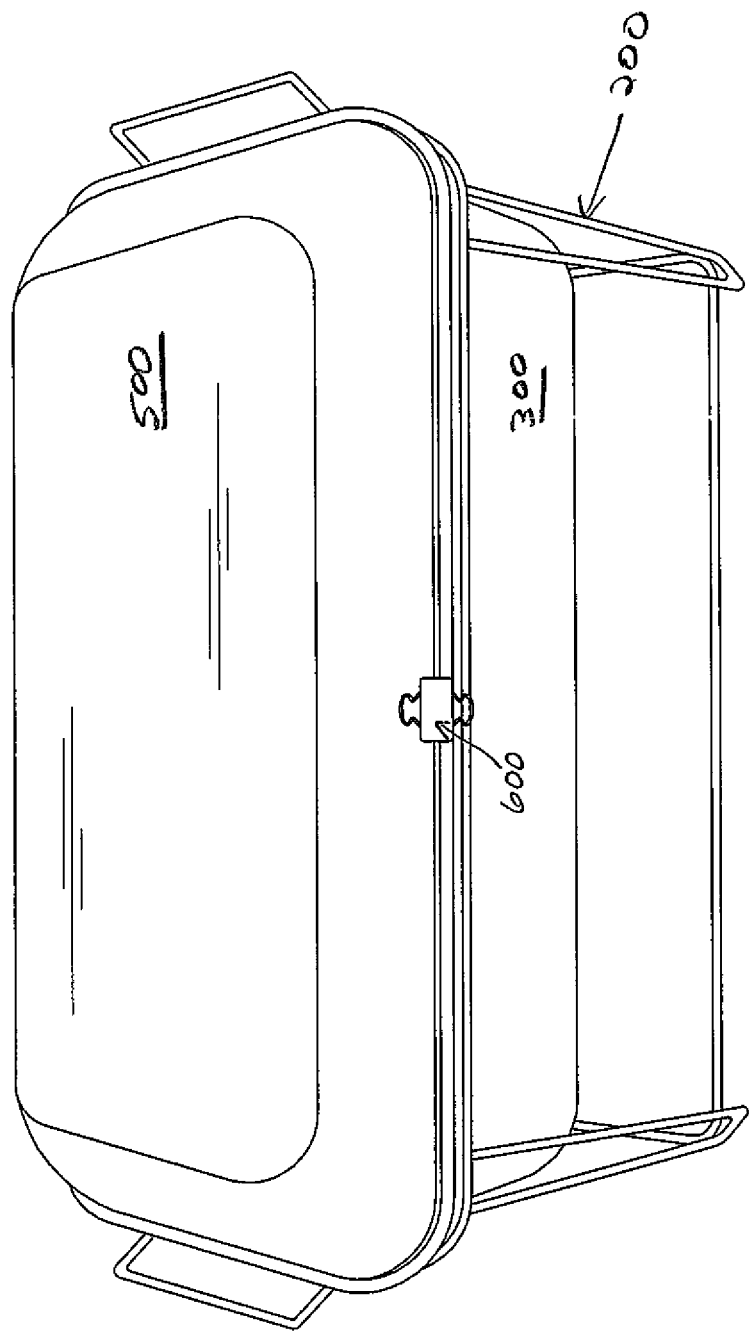
FIG. 8 is a front perspective view of an assembled chafing dish and frame assembly in accordance with a third embodiment of the present invention in the closed position, showing an attachable handle for raising and lowering the disposable food tray cover.
Figure 9:
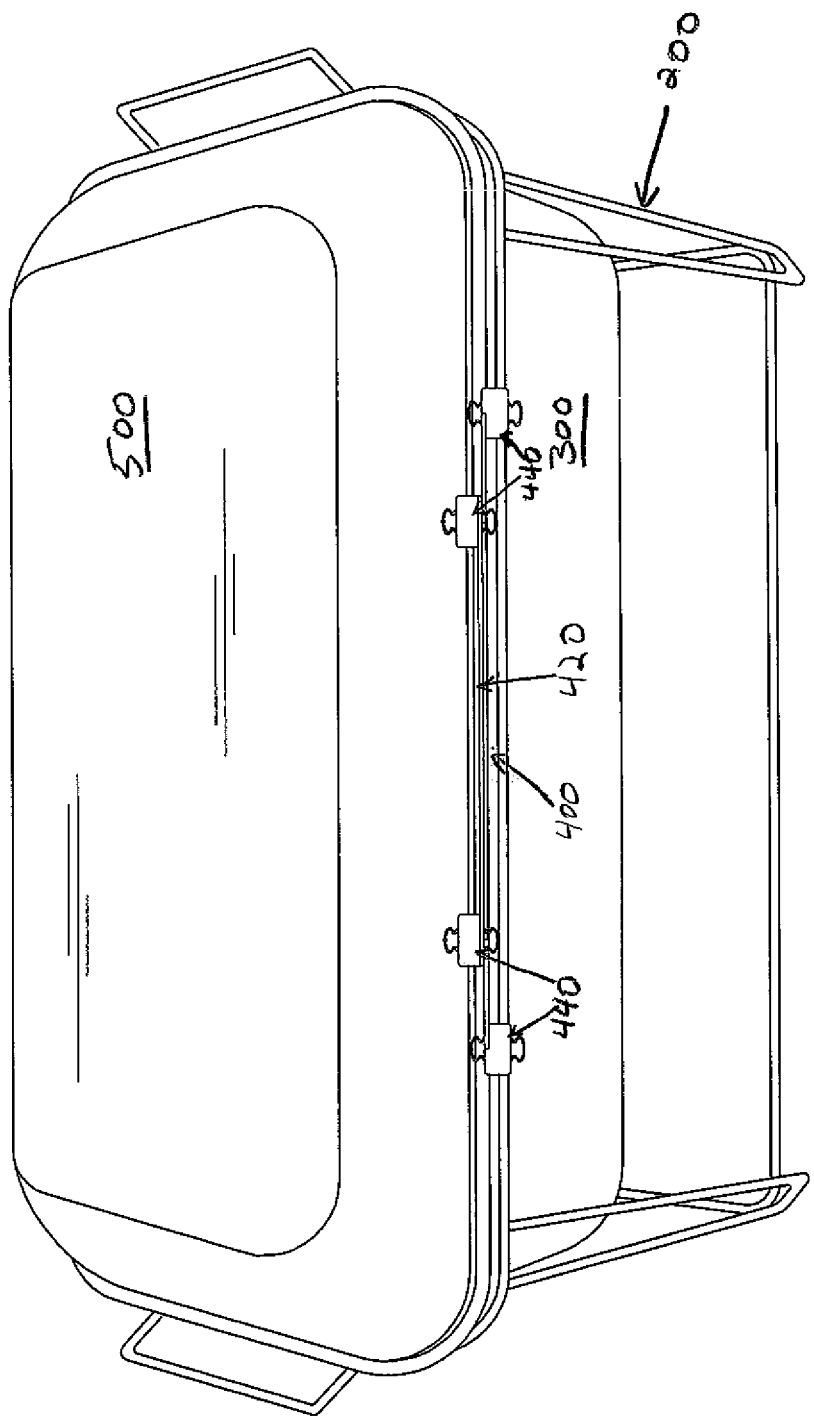
FIG. 9 is a back perspective view of an assembled chafing dish and frame assembly in accordance with a third embodiment of the present invention in the closed position, wherein an upper pivot bar frame assembly pivotally and hingedly attaches the disposable food tray cover to the disposable food tray when it is supported by the lower frame section.

In a third embodiment, as shown in FIGS. 7, 8, and 9, a chafing dish and frame assembly 100, comprises a lower frame section 200 for supporting a disposable food tray 300 for holding food. In addition, an upper pivot bar frame assembly 400 is provided for pivotally and hingedly attaching a disposable food tray cover 500 to the disposable food tray 300.

The upper pivot bar frame assembly 400 includes a hinge support rod 420 and spring loaded clips 440. The spring loaded clips 440 pivot about the support rod 420 and clip onto and attach to the disposable food tray 300 and the disposable food tray cover 500. In this way, and as further shown in FIG. 4, the pivot bar frame assembly 400 permits the disposable food tray cover 500 to be pivoted up to ninety degrees relative to the disposable food tray 300 from a closed position, wherein said disposable food cover rests on top of said lower tray section, to an open position, wherein said disposable food cover is pivoted upwardly so that the food in said disposable food tray may be accessed.

In addition, as shown in FIG. 8, the disposable food cover 500 may further include one or more attachable handles 600 for raising and lowering the disposable food tray cover 500. In further alternate embodiments, the handles 600 can include one or more spring loaded clips.

In the specification the terms "comprise, comprises, comprised and comprising" or any variation thereof and the terms "include, includes, included and including" or any variation thereof are considered to be totally interchangeable and they should all be afforded the widest possible interpretation.

Advantages of the Present Invention

It is an advantage of the present invention to provide a chafing dish and frame assembly having a lower frame section for supporting a disposable food tray for holding food; an upper frame section pivotally attached to the lower frame section; a disposable food cover supported by the upper frame section; and a pivot hinge that pivotally connects the upper frame section to the lower frame section. The upper frame section further provides a structural support and gripping means, which may include one or more handles, for safely pivoting the hot cover or lid to an open or closed position without burning the user's fingers or hands.

It is another advantage of the present invention to provide a chafing dish and frame assembly having both a lower frame section for supporting a disposable food tray for holding food and an upper frame section for supporting a disposable food cover. The upper frame section can be detachably and nestably secured to the lower frame section.

It is yet a further advantage of the present invention to provide a chafing dish and frame assembly having a lower frame section for supporting a disposable food tray for holding food, wherein an upper pivot bar frame assembly detachably and pivotally attaches a disposable food cover to the disposable food tray.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What claimed is:

1. A chafing dish and frame assembly comprising:
   (a) a lower frame section for supporting a disposable food tray;
   (b) said disposable food tray for holding food supported by said lower frame section;
   (c) an upper frame section for supporting said lower frame section;
   (d) a disposable food cover supported by said upper frame section;
   (e) wherein said upper frame section further includes a middle attachment frame that removably and nestably attaches the upper frame section to the lower frame section; and
   (f) a pivot hinge for pivotally connecting said upper frame section to said middle frame section, wherein said pivot hinge allows said disposable food cover to be pivoted up to ninety degrees relative to said disposable food tray from
      (i) a closed position, wherein said disposable food cover rests on top of said lower tray section,
      (ii) to an open position, wherein said disposable food cover is pivoted upwardly so that the food in said disposable food tray may be accessed.

2. A chafing dish and frame assembly as recited in claim 1, wherein said middle frame section nestably connects said upper frame section to said lower frame section by using attachment clips.

3. A chafing dish and frame assembly as recited in claim 1, wherein said lower frame section further supports one or more heating elements.

4. A chafing dish and frame assembly as recited in claim 1, wherein said disposable food tray, said disposable food cover, said lower frame section, and said upper frame section are made of aluminum, steel, iron, copper, aluminum alloy, steel alloy, iron alloy, or copper alloy.

5. A chafing dish and frame assembly as recited in claim 1, wherein said disposable food tray, said disposable food cover, said lower frame section, and said upper frame section are made of aluminum.

6. A chafing dish and frame assembly as recited in claim 1, wherein said upper frame section further comprising one or more handles for raising and lowering the disposable food cover.

7. A chafing dish and frame assembly comprising:
(a) a lower frame section for supporting a disposable food tray;
(b) said disposable food tray for holding food supported by said lower frame section;
(c) an upper pivot bar frame assembly for pivotally and hingedly attaching a disposable food cover to said disposable food tray;
(d) wherein said upper pivot bar frame assembly allows said disposable food cover to be pivoted up to ninety degrees relative to said disposable food tray from
 (i) a closed position, wherein said disposable food tray cover rests on top of said lower tray section,
 (ii) to an open position, wherein said disposable food cover is pivoted upwardly so that the food in said disposable food tray may be accessed;
(e) wherein said upper pivot bar frame assembly uses spring loaded clips attached to a metal bar for pivotally and hingedly attaching a disposable food cover to said disposable food tray.

8. A chafing dish and frame assembly as recited in claim 7, wherein said disposable food tray, said disposable food cover, and said lower frame section are made of aluminum, steel, iron, copper, aluminum alloy, steel alloy, iron alloy, or copper alloy.

9. A chafing dish and frame assembly as recited in claim 7, wherein said disposable food tray, said disposable food cover, and said lower frame section are made of aluminum.

10. A chafing dish and frame assembly as recited in claim 7, wherein said disposable food cover further comprises one or more handles for raising and lowering the disposable food cover.

11. A chafing dish and frame assembly as recited in claim 7, wherein said one or more handles for raising and lowering the disposable food cover include one or more spring loaded clips.

\* \* \* \* \*